E. SCHNEIDER.
SIGHTING AND AIMING APPARATUS FOR FIELD GUNS, COMBINED WITH DEVICES FOR CORRECTING
TRANSVERSE AND LONGITUDINAL INCLINATIONS OF THE GUN CARRIAGE.
APPLICATION FILED DEC. 28, 1920.

1,424,594.

Patented Aug. 1, 1922.
10 SHEETS—SHEET 1.

Inventor:
Eugene Schneider
By Mauro, Cameron, Lewis & Kirkham
attorneys

E. SCHNEIDER.
SIGHTING AND AIMING APPARATUS FOR FIELD GUNS, COMBINED WITH DEVICES FOR CORRECTING TRANSVERSE AND LONGITUDINAL INCLINATIONS OF THE GUN CARRIAGE.
APPLICATION FILED DEC. 28, 1920.

1,424,594.

Patented Aug. 1, 1922.
10 SHEETS—SHEET 2.

INVENTOR
Eugene Schneider

BY
Mauro, Cameron, Lewis & Kirkam
ATTORNEYS

E. SCHNEIDER.
SIGHTING AND AIMING APPARATUS FOR FIELD GUNS, COMBINED WITH DEVICES FOR CORRECTING TRANSVERSE AND LONGITUDINAL INCLINATIONS OF THE GUN CARRIAGE.
APPLICATION FILED DEC. 28, 1920.

1,424,594.

Patented Aug. 1, 1922.
10 SHEETS—SHEET 3.

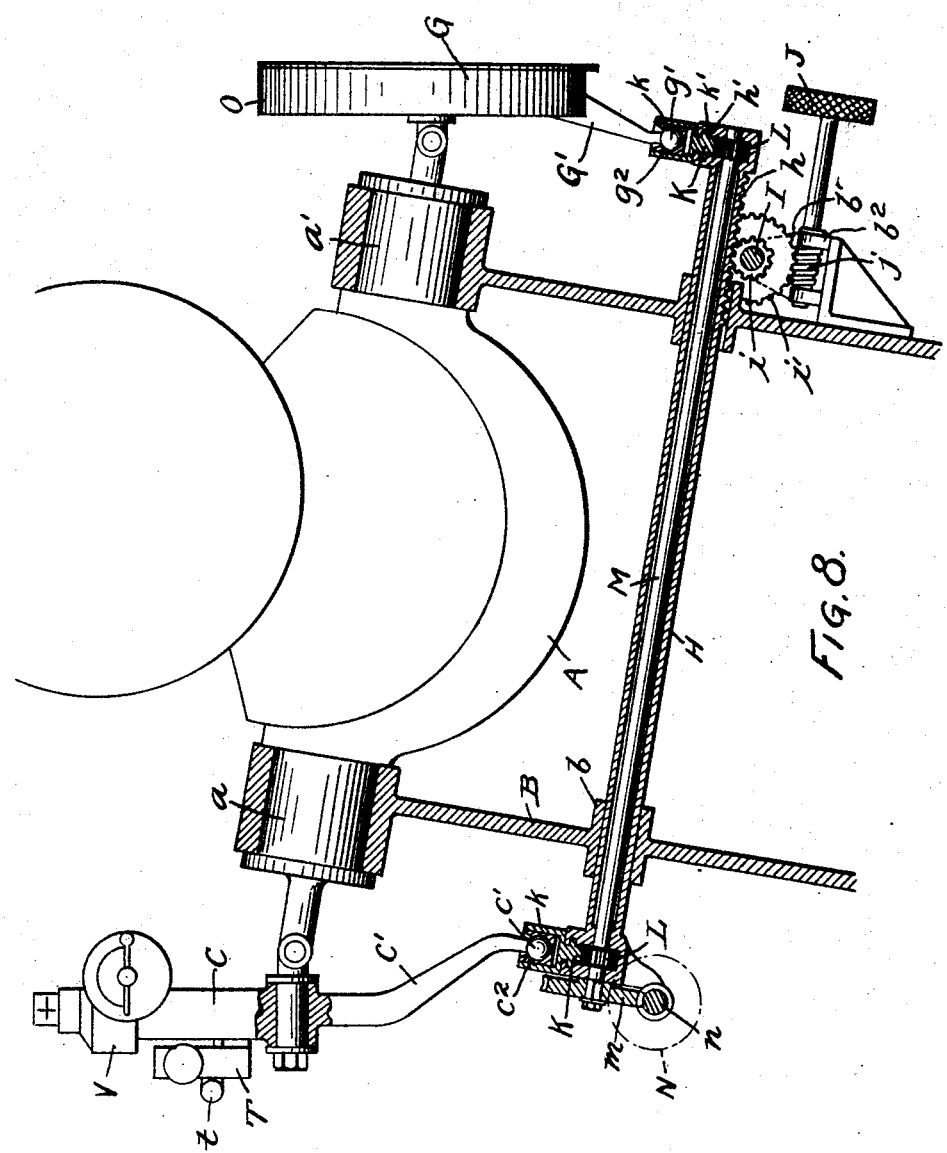

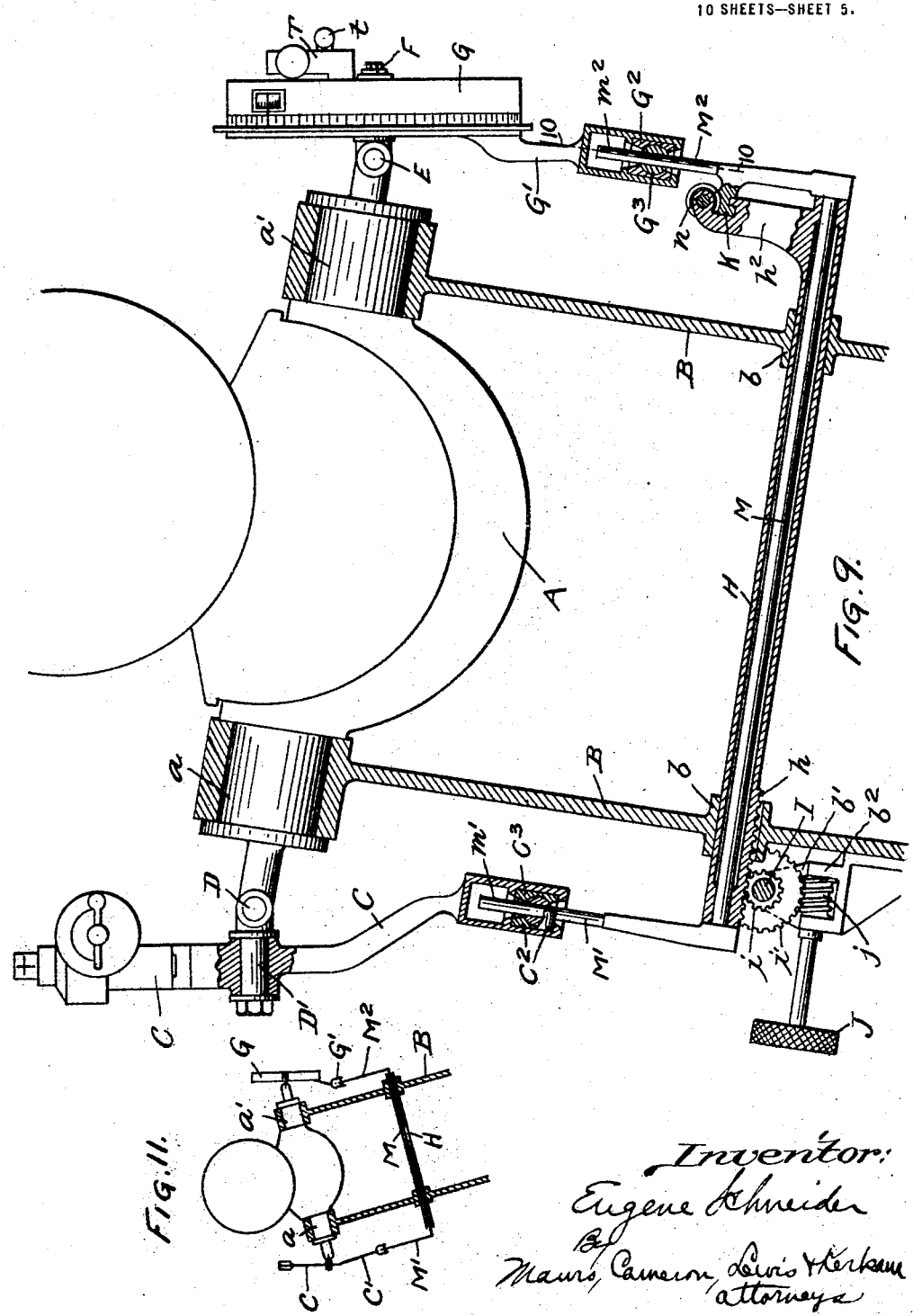
E. SCHNEIDER.
SIGHTING AND AIMING APPARATUS FOR FIELD GUNS, COMBINED WITH DEVICES FOR CORRECTING TRANSVERSE AND LONGITUDINAL INCLINATIONS OF THE GUN CARRIAGE.
APPLICATION FILED DEC. 28, 1920.
1,424,594.   Patented Aug. 1, 1922.
10 SHEETS—SHEET 5.

E. SCHNEIDER.
SIGHTING AND AIMING APPARATUS FOR FIELD GUNS, COMBINED WITH DEVICES FOR CORRECTING TRANSVERSE AND LONGITUDINAL INCLINATIONS OF THE GUN CARRIAGE.
APPLICATION FILED DEC. 28, 1920.

1,424,594.

Patented Aug. 1, 1922.
10 SHEETS—SHEET 6.

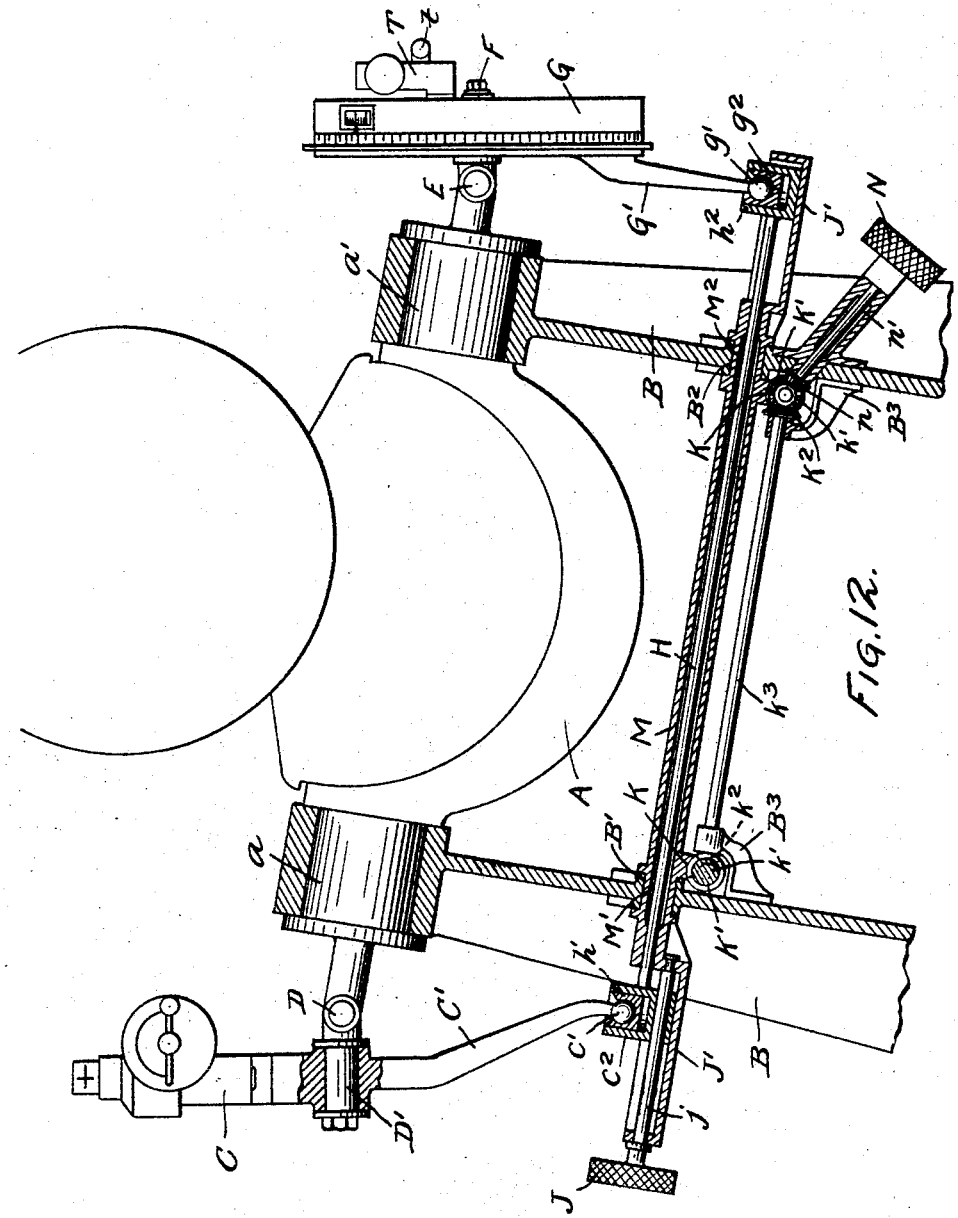

E. SCHNEIDER.
SIGHTING AND AIMING APPARATUS FOR FIELD GUNS, COMBINED WITH DEVICES FOR CORRECTING TRANSVERSE AND LONGITUDINAL INCLINATIONS OF THE GUN CARRIAGE.
APPLICATION FILED DEC. 28, 1920.

1,424,594.

Patented Aug. 1, 1922.
10 SHEETS—SHEET 8.

INVENTOR
Eugene Schneider

BY
Mauro Cameron Lewis & Kirkham
ATTORNEYS.

E. SCHNEIDER.
SIGHTING AND AIMING APPARATUS FOR FIELD GUNS, COMBINED WITH DEVICES FOR CORRECTING
TRANSVERSE AND LONGITUDINAL INCLINATIONS OF THE GUN CARRIAGE.
APPLICATION FILED DEC. 28, 1920.

1,424,594.

Patented Aug. 1, 1922.
10 SHEETS—SHEET 10.

INVENTOR
Eugene Schneider

BY
Mauro, Cameron, Lewis & Kirkam

ATTORNEYS.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

SIGHTING AND AIMING APPARATUS FOR FIELD GUNS, COMBINED WITH DEVICES FOR CORRECTING TRANSVERSE AND LONGITUDINAL INCLINATIONS OF THE GUN CARRIAGE.

1,424,594.   Specification of Letters Patent.   Patented Aug. 1, 1922.

Application filed December 28, 1920. Serial No. 433,659.

*To all whom it may concern:*

Be it known that I, EUGÈNE SCHNEIDER, citizen of the Republic of France, resident of Paris, France, have invented new and useful improvements in sighting and aiming apparatus for field guns, combined with devices for correcting transverse and longitudinal inclinations of the gun carriage, which invention is fully set forth in the following specification.

Field guns comprise generally for aiming a sighting apparatus, a device for reading the site angles, a device for reading the ranges, and means for bringing the sighting apparatus and these devices into a vertical plane in the case of a transverse inclination of the trunnions of the gun carriage cradle, as well as into a zero position in the said plane in the case of longitudinal inclination of the gun carriage.

In order that the support for the sighting apparatus which is inclined transversely with the trunnions of the gun cradle, may be returned into a vertical plane, the said support is jointed to one of these trunnions by a Cardan joint, one axis of which is parallel to the axis of the gun barrel.

The device for reading the ranges must, in order that its indications shall be correct, be able likewise to be returned always into a vertical plane.

In Patent No. 1,361,779, dated Dec. 7, 1920, there is described a combination of a sighting apparatus and a device for reading the ranges and the site angles, where these elements of the aiming apparatus, being located all on one and the same side of the gun barrel, are returned into an upright position simultaneously by the fact that the device for reading the ranges is carried by the actual support of the sighting apparatus.

The present invention has for its object a combination of a sighting apparatus and devices for reading the ranges and the site angles, where those elements of the aiming apparatus are arranged on two sides of the gun barrel; the device for reading the ranges being always on the side opposite to that of the sighting apparatus, so that these elements shall be able to be operated by two separate gun servers.

The invention consists in an arrangement which, notwithstanding this separation between the sighting apparatus and the device for reading the ranges, allows nevertheless of effecting their simultaneous uprighting, that is to say, their simultaneous return into vertical planes, and into a zero position in said planes, by means of common mechanisms operated by one of the gun servers for returning it into vertical planes, and by the other gun server for returning it into a zero position in said planes; the device for reading the site angles being itself uprighted by these operations whether it is carried by the sighting apparatus or by the device for reading the ranges.

Various constructional forms of this invention are illustrated in the accompanying drawings in which:—

Figs. 1 to 5 illustrate a first constructional form.

Fig. 1 is a transverse sectional elevation of a gun carriage provided with the improvements of the present invention.

Fig. 2 is a side elevation partly in section on the line 2—2 of Fig. 1.

Figure 1:
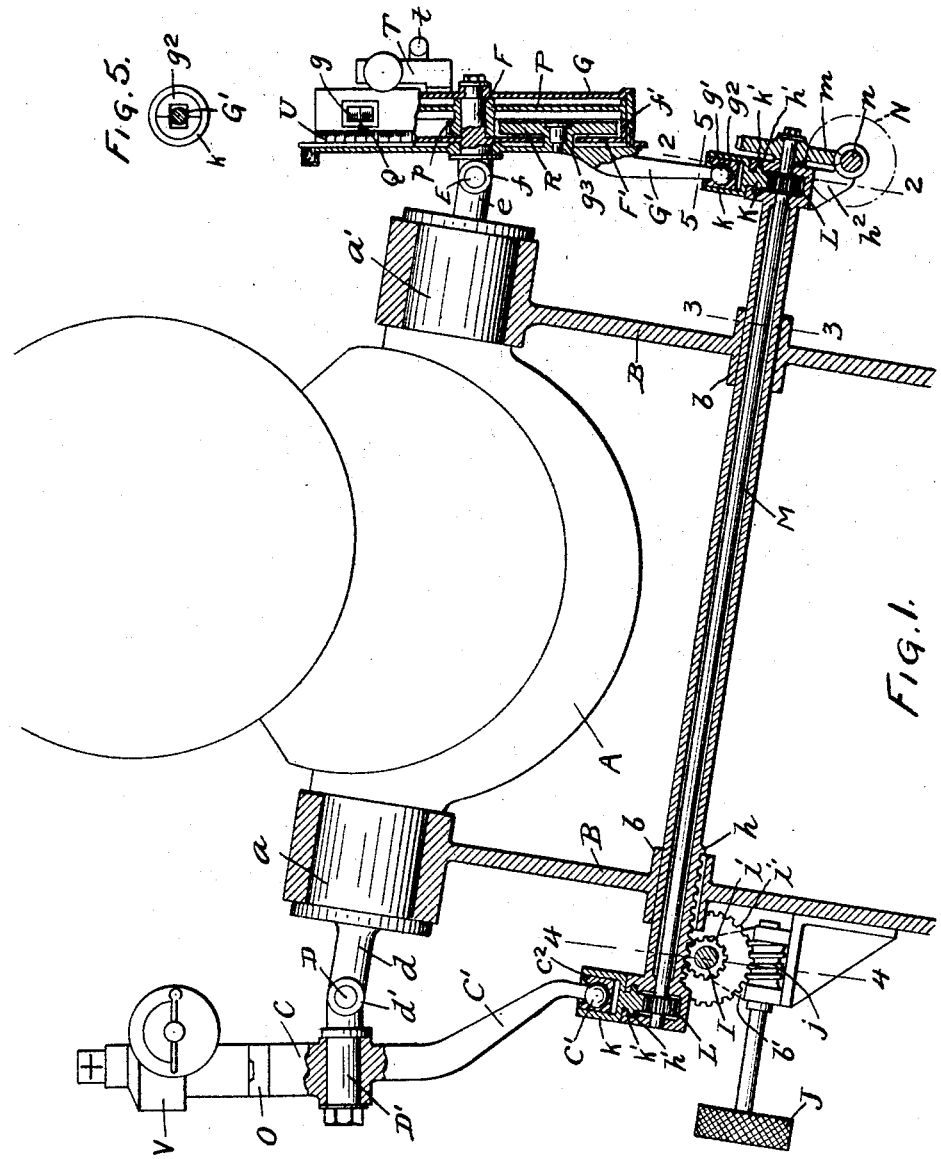
Figure 2:
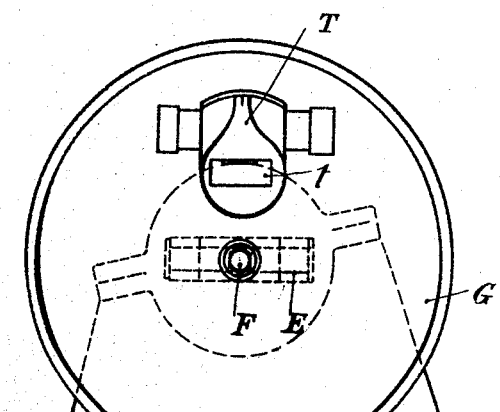
Figure 3:
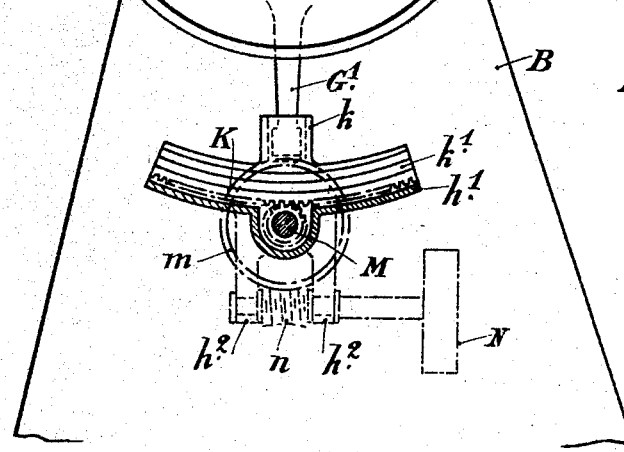
Figure 4:
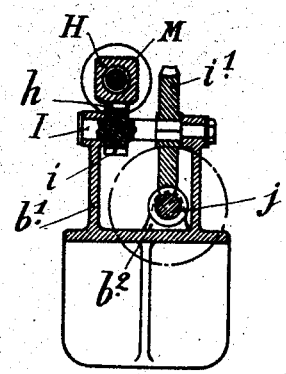

Figs. 3, 4 and 5 are partial sections respectively on the lines 3—3, 4—4 and 5—5 of Fig. 1.

Figure 7:
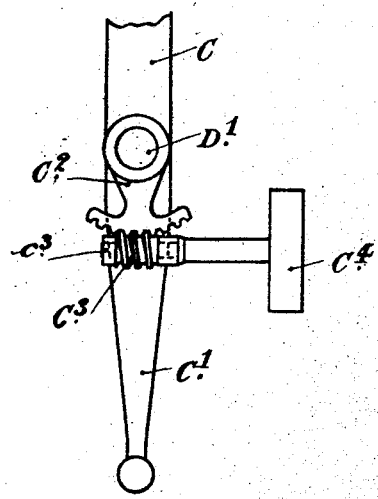
Figure 6:
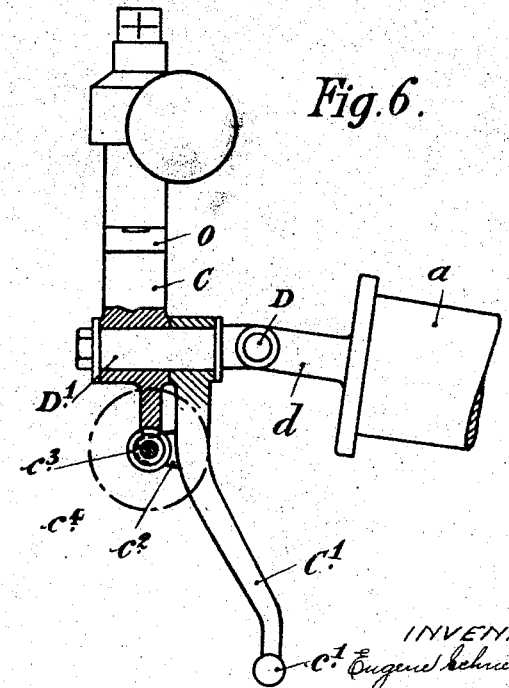

Figs. 6 and 7 are respectively a longitudinal sectional elevation and a side elevation of a modification.

Fig. 8 is a section of the general arrangement similar to that of Fig. 1, illustrating another form of application of this invention.

Figure 10:
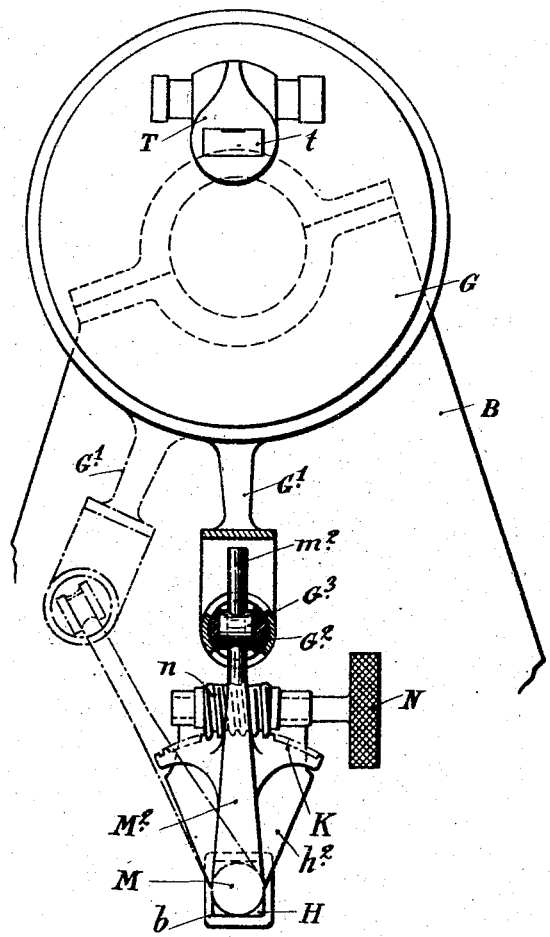

Figs. 9 to 11, inclusive, illustrate another constructional form of this invention.

Fig. 9 is a cross-section of a gun carriage embodying this constructional form of the invention.

Fig. 10 is a side elevation viewed from the right-hand side of Fig. 9, partly in section, on the line 10—10 of the latter figure.

Fig. 11 is a diagrammatic vertical cross-section similar to that of Fig. 9 showing the gun carriage inclined transversely in the opposite direction to that in which it is shown inclined in Fig. 9.

Figure 13:
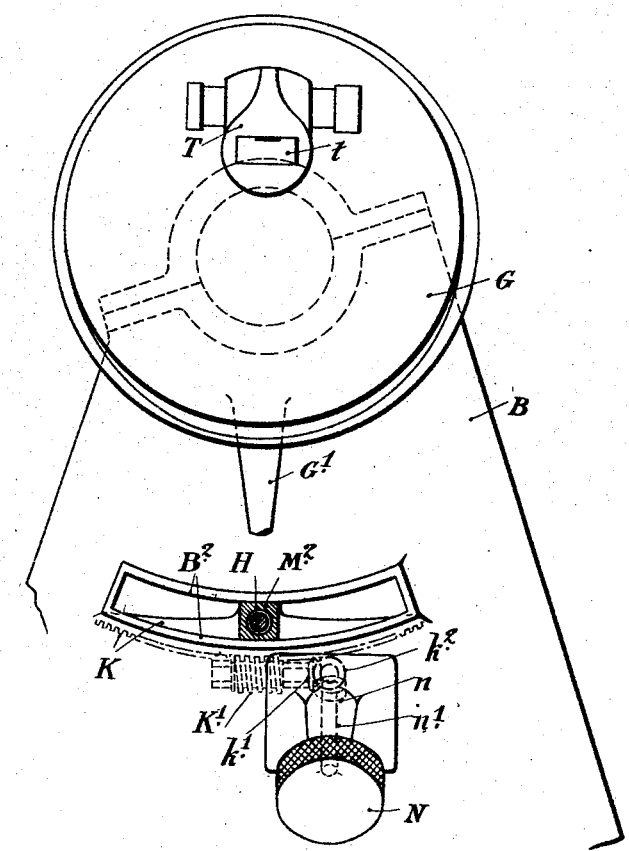

Figs. 12 and 13 show another constructional form of the invention.

Fig. 12 is a cross-sectional elevation of a gun carriage embodying this constructional form.

Fig. 13 is a side elevation, partly in section, of the part shown in Fig. 12.

Figure 14:
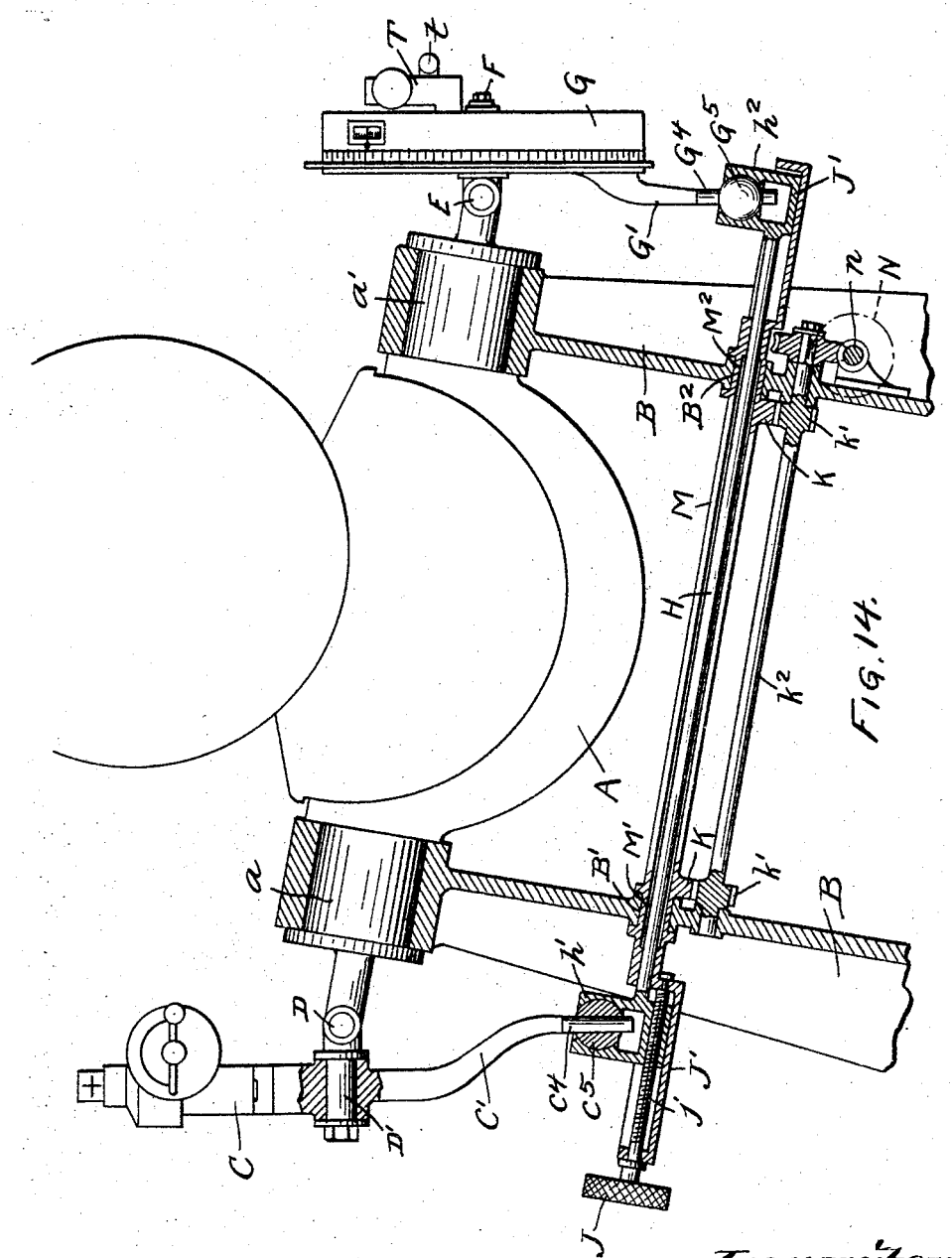
Figure 15:
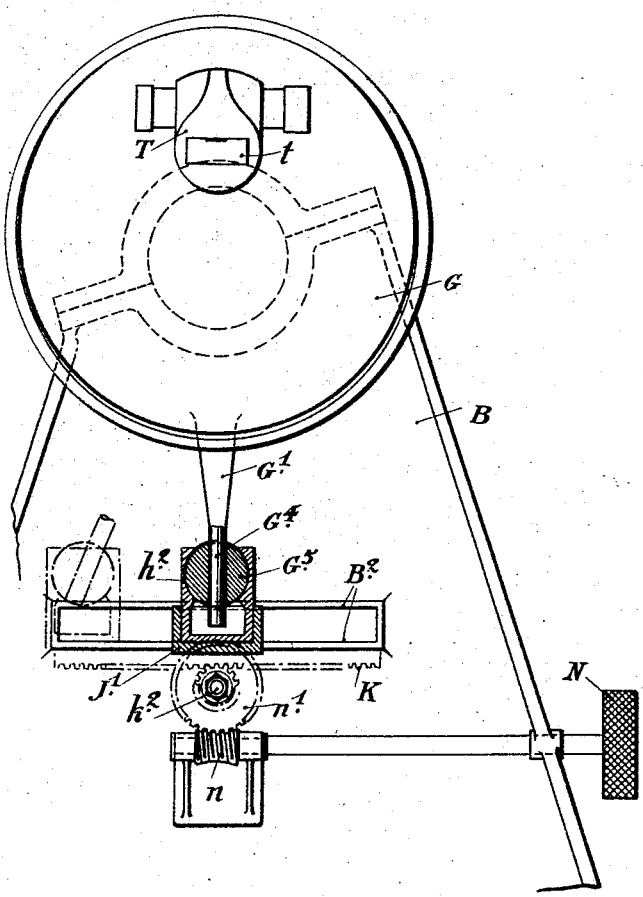

Figs. 14 to 15 inclusive illustrate a modification of the constructional example shown in Figs. 12—13.

Fig. 14 is a cross-section of a gun carriage embodying this modification.

Fig. 15 is a side elevation, partly in section, of the part shown in Fig. 14.

In Figs. 1 to 8, A is the gun carriage cradle of a field gun. $a$ and $a^1$ are the trunnions of this cradle; B are the side plates of the gun carriage frame.

The elevation movements of the cradle and gun barrel together are produced by an elevating apparatus of any suitable type, not shown.

The bracket C of the sighting apparatus is jointed to the trunnion $a$ by a Cardan joint. This joint comprises an axle D parallel to the axis of the gun barrel and carried by a block $d$ fixed to the trunnion $a$. Around the axle D there is adapted to pivot, by means of an eye $d^1$, an axle $D^1$ that serves in its turn as a pivot for the bracket C.

The device for reading the ranges is jointed by a Cardan joint to the trunnion $a^1$ of the cradle. This joint comprises an axle E parallel to the axis of the gun barrel and carried by a block $e$ fixed to the said trunnion $a^1$. An axle F at right angles to the axis E and carrying the device for reading the ranges, is adapted to pivot by means of an eye $f$ around the axle E.

This device for reading the ranges comprises for instance a casing or bracket G movable around the axle F.

According to this invention, the bracket C of the sighting apparatus and the casing G of the device for reading the ranges are conjugated with two mechanisms which are adapted to be uprighted, one by the left hand gun server, and the other by the right hand gun server, in such a manner that they shall be able at all times, on the one hand and irrespectively of the transverse inclination of the axis of the trunnions $a$, $a^1$, to be returned simultaneously into vertical planes; and on the other hand of being simultaneously returned into a zero position in these planes. For this purpose the bracket C and the casing G are connected by respective extensions $C^1$ and $G^1$, to a common mount H movable transversely in guides $b$ formed in the frame plates B of the gun carriage. This mount H which is thus guided parallelly to the axis of the trunnions $a$, $a^1$, is adapted to receive longitudinal motion along its axis by means of an actuating mechanism controlled by one or the other of the gun servers.

In the example shown in Figs. 1 to 5, the control is assumed to be the duty of the left hand gun server; it may comprise for example a rack $h$ formed on the mount H and meshing with a pinion $i$ fixed on an axle I journalled in bearings $b^1$ formed on a bracket fixed to the corresponding frame plate of the gun carriage. The axle I carries on the other hand a worm wheel $i^1$ meshing with a worm $j$ which is adapted to be operated by means of a knurled hand wheel J and is journalled in bearings $b^2$ formed on the bracket carrying the bearings $b^1$.

The connection between the extension $C^1$ and the mount H is effected by means of a Cardan joint. For this purpose the extension comprises a cylindrical axle $c^1$ which can turn in a cylindrical block $c^2$ that is itself guided in a cylindrical socket $k$ formed on a toothed sector K that is centered on the axis of the trunnions $a$, $a^1$ and is guided by means of concentric ribs $k^1$ in grooves $h^1$ of corresponding shape formed in the mount H. The generatrices of the socket $k$ and those of the block $c^2$ are at right angles to the generatrices of the axle $c^1$ and of its socket in the block $c^2$. The extension $G^1$ of the casing G is engaged by a cylindrical axle $g^1$ formed at its end in a cylindrical block $g^2$ whose generatrices are at right angles to the generatrices of the axle $g^1$. The block $g^2$ is guided, like the block $c^2$, in a cylindrical socket $k$ formed on a toothed sector K arranged like the left hand sector K and guided by means of ribs $k^1$ in concentric grooves $h^1$ formed on the mount H.

The toothed sectors K mesh each with a pinion L fixed on a shaft M journalled in a tubular recess of the mount H.

On the same shaft M there is fixed a worm wheel $m$ meshing with a worm $n$ that is operated by means of a knurled hand wheel N, and is journalled in brackets $h^2$ fixed to the mount H. It will be readily perceived that on actuating the hand wheel J, the gearing $j$—$i^1$—$l$ will actuate the rack $h$, and consequently produce a rectilinear movement of the mount H. The result of this is a simultaneous rotation of the sighting apparatus C and of the casing G containing the device for reading the ranges, respectively around the axle D and the axle E. If the axis of the trunnions $a$ and $a^1$ of the cradle is inclined from the horizontal as shown in Fig. 1, the left hand gun server by actuating the hand wheel J, is able to return the bracket C and the casing G into vertical planes. He will ascertain this uprighting by bringing within its marks the bubble of a transverse spirit level O carried by the bracket C.

The device for reading the ranges may be of any known type and may comprise for instance as shown in the drawings, a drum P on the periphery of which there is marked a scale of ranges visible through a window $g$ formed in the casing G. On one of the longitudinal edges of this window there is provided a mark Q. The drum P is fixed to a pinion $p$, the whole P—$p$ being mounted loose on the axle F. The pinion $p$ meshes with a toothed wheel R which is mounted loose on an axle $g^3$ fixed to the casing G. The toothed wheel R meshes in its turn with a ring of teeth $f^1$ formed on a plate $F^1$ fixed to the axle F. It will be perceived that the angular movements imparted to the cradle A by means of the elevating mechanism, are transmitted by the ring of teeth $f^1$ to the wheel R, and through the latter to the pinion $p$ and the range drum P; the amplitude of the movements of the gun barrel are multiplied by the ratio between the number of teeth of the wheel R and that of the pinion $p$.

In the example shown in Figs. 1 to 5, the casing G serves to support a device T of any known construction for reading the site angles.

On the casing G there is movably mounted in such a manner as to be capable of being moved by hand, a register drum U, the purpose of which is hereinafter described.

The aiming and correcting operations necessitated by the transverse and longitudinal inclinations of the gun carriage, are performed as follows, by means of the described apparatus.

The left hand gun server has the duty of operating the sighting apparatus V, of operating the training mechanism, and of actuating the hand wheel J, for the purpose of maintaining the bracket C and the casing G in vertical planes. The right hand gun server has the duty of operating the elevating mechanism by means of which he elevates first the cradle and gun barrel together through an angle corresponding to the site angle. This first operation is performed in the usual manner by inclining the site spirit level T through the given angle, followed by the return of the bubble between its marks, by actuating the hand wheel N. This actuation has the result of actuating through the gearing $n$—$m$, the pinions I and the toothed sectors K. The extension $G^1$, and consequently the casing G, move around the axle F, carrying with them the wheel R which rolls over the ring of teeth $f^1$ that is kept stationary. The wheel R thus causes the pinion $p$ to turn around the axle F through an angle corresponding to the site angle, but multiplied by the ratio between the numbers of teeth of the wheel R and the pinion $p$.

If before the actuation of the hand wheel N, the zero mark of the range graduation is situated opposite the mark Q, this zero will be displaced by this maneuver through an angle corresponding to the site angle.

The right hand gun server can from this moment onwards, elevate the gun. For this purpose he brings the selected scale mark of ranges opposite the mark Q by actuating the elevating mechanism. The gun server has thus elevated the gun barrel by a total angle equal to the sum of the site angle and the range angle. The indications of the site angle and range angle are always exact irrespectively of the transverse inclination of the trunnions $a$, $a^1$, if the left hand gun server takes care to keep the bubble of the spirit level O always between its marks by actuating the hand wheel J.

For training the gun barrel, the left hand gun server is obliged in the usual manner to actuate the training mechanism in such a manner as to keep the line of sight directed upon the auxiliary target. Of course this gun server must make sure of the correct position of the line of sight by a suitable elevation movement relatively to the bracket C.

The right hand gun server makes during the firing the corrections due to the longitudinal inclinations of the gun carriage by actuating the hand wheel N in such a manner as to maintain the bubble of the site angle spirit level $t$ between its marks, and by then operating the elevating mechanism in such a manner as to return the selected range scale mark opposite the register mark Q. He thus re-establishes the zero position both as regards the device for reading the ranges and the site angles and the bracket of the sighting apparatus. In order that the shifting of the selected range scale mark relatively to the register mark Q, shall be capable of being done without the gun server having to remember the given range, it will be sufficient for him to have brought in front of the register mark Q the same scale mark of the register plate U; in this manner he will keep always an indication of the given range.

As shown, the conjugation between the extensions $G^1$ and $C^1$ formed respectively on the casing of the device for reading the ranges and the bracket of the sighting apparatus, serves to keep these extensions always absolutely parallel. The actuation of the hand wheel J produces simultaneous movements of the two extensions in the transverse direction, whereas the actuation of the hand wheel N produces their simultaneous movements in the longitudinal direction.

The result is that if the gun barrel is properly aimed, and the line of sight is directed upon the auxiliary target, it will be sufficient, for the purpose of constantly correcting the effects of longitudinal and transverse inclinations of the gun carriage, for the left hand gun server to keep the bubble of the spirit level O between its marks by actuating the hand wheel J, whereas he keeps the line of sight directed upon the target by a suitable actuation of the training mechanism. For his part, the right hand gun server has the duty of keeping the bubble of the spirit level $t$ between its marks.

From the foregoing it will be noted that at the commencement of the aiming operations, the right hand gun server in giving the site angle, shifts the extension $C^1$ at the same time as the extension $G^1$. If at this moment the left hand gun server has already directed the line of sight upon the auxiliary target, this line of sight will be shifted through an angle corresponding to the site angle. With the apparatus illustrated in Fig. 1, it will be necessary that the sighting apparatus proper (for instance a collimator) shall be capable of being shifted in the sighting plane.

The modification illustrated in Figs. 6 and 7 shows an apparatus where the shifting of the sighting apparatus proper in the sighting plane, instead of being produced by reason of the mobility of this apparatus relatively to the bracket C fixed to the extension $C^1$, is here produced by a shifting of the bracket C relatively to its extension $C^1$. As shown in these figures, the bracket C and an arm $C^1$ are both jointed on the axle $D^1$.

The joint eye of the bracket C carries a sector with helical teeth $C^2$ having its centre on the axis of the pivot $D^1$ and meshing with a worm $C^3$ journalled in bearings $c^3$ projecting from the extension $C^1$. By actuating the worm $C^3$ by means of the hand wheel $C^4$, the desired relative shifting movement between the extension $C^1$ and the bracket C can be produced.

In the example of application of this invention illustrated in Fig. 8, it is assumed that the device T—$t$ for reading the site angles is carried by the bracket C of the sighting apparatus V.

On the other hand the mechanism for shifting the mount H longitudinally, instead of being arranged to be operated by the left hand gun server, is located on the right hand, whereas, inversely, the mechanism for actuating the shaft N (gearing N—$n$—$m$) is provided on the left hand. By means of the mechanisms thus arranged, the right hand gun server must by a suitable actuation of the hand wheel J, keep within its marks the bubble of a transverse spirit level O mounted on the casing G. By this means he will ensure the maintenance of the casing G and bracket C in vertical planes so as to correct the effects of any transverse inclination of the trunnions $a$, $a^1$ of the cradle. The left hand gun server for his part must, by a suitable actuation of the training mechanism, keep the line of sight in the sighting plane, and by actuating the hand wheel N, keep the bubble of the spirit level $t$ between its marks, thereby effecting a shifting of the range scale mark corresponding to the longitudinal inclination of the gun carriage, and thus compelling the right hand gun server to return the selected range scale mark opposite the register mark Q in order to correct the firing angle by the amount of an angle corresponding to the said longitudinal inclination.

In the constructional form shown in Figs. 9 to 11, A is the gun carriage cradle of a field gun. $a$, $a^1$ are the trunnions of the said cradle. B are the frame plates of the gun carriage. To the trunnion $a$ there is jointed by means of a Cardan joint D—$D^1$ the bracket C of the sighting apparatus. To the trunnion $a^1$ of the cradle there is jointed by means of a Cardan joint E—F the device G for reading the ranges. In the same manner as in the hereinbefore described constructional forms, the bracket C of the sighting apparatus and the casing G of the device for reading the ranges are conjugated with two mechanisms which are operable, one by the left hand gun server, and the other by the right hand gun server, in such a manner that both devices shall be able at any time, on the one hand and irrespectively of the transverse inclination of the axis of the trunnions $a$, $a^1$, to be returned simultaneously into vertical planes, and on the other hand to be returned simultaneously to the starting position in those planes. Similarly, the bracket C and the casing G are connected each by an extension (respectively $C^1$, $G^1$) to a common mount H movable transversely in guides $b$ formed in the carriage frame plates B. This mount H which is thus guided parallelly to the axis of the trunnions $a$, $a^1$, is adapted to be moved longitudinally along its axis by an actuating mechanism placed under the control of one of the gun servers, in the example shown, the left hand gun server. This actuating mechanism comprises a rack $h$ formed on the mount H and meshing with a pinion $i$ fixed on an axle I journalled in bearings $b^1$ formed on a bracket fixed to the corresponding carriage frame plates. The axle I carries also a worm wheel $i^1$ meshing with a worm $j$ that can be actuated by means of a hand wheel J and journalled in bearings $b^2$ formed on the bracket carrying the bearings $b^1$.

The characteristic feature of the constructional form shown in Figs. 9 to 11, is the peculiar manner of connection between the extensions $C^1$, $G^1$ and the mount H, which connection is designed to simplify the transmission of the control for making the longitudinal corrections (return of the apparatus into a starting position in their respective planes when returned into the vertical); at the same time this simplified construction reduces the risk of errors due after a certain period of working to the play between the teeth of the gear wheels.

In the mount H there is journalled a shaft M on the ends of which are fixed two rods $M^1$, $M^2$ whose free ends $m^1$, $m^2$ are cylindrical. The rod $m^1$ is adapted to slide in one of the elements of a Cardan joint by which the extension $C^1$ is connected to the mount H, while the cylindrical rod $m^2$ is able for its part, to slide in one of the elements of the Cardan joint by which the extension $G^1$ is connected to the same mount H. The connecting Cardan joint between the extension $C^1$ and the mount H, comprises a cylindrical block $C^2$ working in a socket of corresponding shape formed on the end of the extension $C^1$. In the cylindrical block $C^2$ which constitutes one of the axles of the Cardan joint there is adapted to revolve a second cylindrical block $C^3$ constituting the other axle of the Cardan joint, and which is mounted on the cylindrical rod $m^1$. The generatrices of the block $C^3$ are thus at right angles to those of the axle $m^1$.

The Cardan joint connecting the extension $G^1$ to the mount H is constructed in the same manner. It comprises a cylindrical block $G^2$ working in a socket of corresponding shape formed on the end of the extension $G^1$ and constituting one of the axles of the Cardan joint, the second axle being formed by a cylindrical block $G^3$ working in the cylinder $G^2$ and mounted on a cylindrical rod $m^2$.

It will be at once perceived that the actuation of the hand wheel J, by causing a movement of the rack $h$ to shift the mount H, will produce through the medium of the rods $m^1$, $m^2$, a rotation of the Cardan axles $C^3$, $G^3$ in the axles $C^2$, $G^2$, and consequently a transverse inclination of the extensions $C^1$, $G^1$ with a resulting rotation of the devices C, G around their Cardan axles D, E. On the other hand the rotation of the devices C, G around their other axles $D^1$ and F is produced by the rotation of the shaft M with a resulting rotation of the two axles $m^1$, $m^2$. This rotation is produced very simply by means of a single sector K having helical teeth projecting laterally from the rod $M^2$ and meshing with a worm $n$ which is operated by means of a hand wheel N and is journalled in brackets $h^2$ fixed to the mount H.

This constructional form comprises, like that shown in Figs. 1 to 8, Cardan joints between the extensions formed respectively on the sighting apparatus and the device for reading the ranges, and two gears one of which actuates simultaneously one of the elements $C^3$, $G^3$ of these Cardan joints, and the other actuates simultaneously the other two elements $C^2$, $G^2$ of the said Cardan joints. As in the constructional form shown in Figs. 1 to 8, these two gears are conjugated to a mount for the transverse movements, said mount providing bearings for a shaft for transmitting the longitudinal movements.

In the constructional example illustrated in Figs. 12—13, the extensions $C^1$ and $G^1$ bear directly at their lower ends one of the elements of a Cardan joint, that is to say, a cylindrical axle $c^1$, $g^1$ respectively, adapted to turn in a cylindrical block $c^2$, $g^2$ respectively, guided in a cylindrical socket $h^1$, $h^2$ respectively, formed on the end of a rod-shaped mount H which is capable of sliding at right angles to the carriage frame plates B in a sheath M guided by means of two slides $M^1$, $M^2$ in arc-shaped slideways $B^1$, $B^2$ formed in the frame plates B and having their centres on the axis of the trunnions of the cradle.

The rotation of the devices C and G around their Cardan axle D, E, is effected by a longitudinal movement of the mount H in the sheath M. This movement is produced for instance by means of a screw $j$ operated by a hand wheel J and journalled in a bracket fixed to the sheath M. This screw actuates one of the sockets $h^1$ that serves as a nut and is prevented from turning by its guidance in the bracket $J^1$ in which the screw is journalled.

The rotation of the devices C and G around their other Cardan axle $D^1$, F is produced by a movement of the sheath M in the guides $B^1$, $B^2$. This movement may be produced for instance as shown in Figs. 12 and 13 of the drawings as follows:—The sheath M carries two sectors K having helical teeth meshing with worms $K^1$ which are journalled in brackets $B^3$ fixed to the frame plates B. These screws carry at their ends pinions $k^1$ whose movements are conjugated by means of two bevel pinions $k^2$ fixed on the ends of a shaft $k^3$. The right hand pinion $k^1$ is actuated by means of a pinion $n$ fixed on the end of a shaft $n^1$ that can be operated by means of a hand wheel N.

In the modification shown in Figs. 14—15 the sheath M, instead of being shifted in circular guides formed in the frame plates B, is adapted to be moved in straight guides $B^1$, $B^2$. In such a case the Cardan joint connecting the extensions $C^1$, $G^1$ and the mount H, comprises a cylindrical tail $C^4$, $G^4$ on the end of the extension and working in a ball $C^5$, $G^5$ which is itself movable in a correspondingly shaped socket formed in a box $h^1$, $h^2$ carried by the mount H. The longitudinal movements of the mount are produced as shown in the example of Figs. 12 and 13. The movements of the sheath M are produced by means of racks K fixed to the said sheath and actuated by means of spur pinions $k^1$ fixed on a shaft $k^2$. This latter shaft carries also a worm wheel $n^1$ which is actuated by a worm $n$ operated by means of a hand wheel N.

Having now particularly described and ascertained the nature of my said invention and in what manner the same is to be performed, I declare that what I claim is:—

1. In a sighting apparatus for guns, the combination of a gun carried by a cradle having trunnions journaled in a carriage, with a sighting device pivotally mounted on one of the trunnions, a range-reading device pivotally mounted on the other trunnion, means connecting the two devices for maintaining them in conjugate relation, and means for simultaneously moving both devices on their pivotal connections to position the same vertically irrespective of any transverse inclination of the trunnions.

2. In a sighting apparatus for guns, the combination of a gun carried by a cradle having trunnions journaled in a carriage, with a sighting device pivotally mounted on one of the trunnions, a range-reading device pivotally mounted on the other trunnion, means connecting the two devices for maintaining them in conjugate relation, and means for simultaneously moving both devices on their pivotal connections to zero position irrespective of any longitudinal inclination of the gun carriage.

3. In a sighting apparatus for guns, the combination of a gun carried by a cradle having trunnions journaled in a carriage, with a sighting device pivotally mounted on one of the trunnions, a range-reading device pivotally mounted on the other trunnion, means connecting the two devices for maintaining them in conjugate relation, mechanism operable from one side of the carriage for simultaneously moving both devices on their pivotal connections to position the same vertically irrespective of any transverse inclination of the trunnions, and a second mechanism associated with the first mechanism and operable from the other side of the carriage for simultaneously moving both devices on their pivotal connections to zero position irrespective of any longitudinal inclination of the gun carriage.

4. In a sighting apparatus for guns, the combination of a gun carried by a cradle having trunnions journaled in a carriage, with brackets connected to the respective trunnions by joints each having an axis parallel to the axis of the gun barrel, means connecting the two brackets to maintain the same in conjugate relation, indicators carried by said brackets, and mechanism operative to displace simultaneously the brackets around the axes of their respective joints to position the indicators in vertical planes irrespective of any transverse inclination of the trunnions.

5. In a sighting apparatus for guns, the combination of a gun carried by a cradle having trunnions journaled in a carriage, with brackets respectively mounted on the trunnions, each bracket being journaled on an axle hinged to its respective trunnion with the axis of the hinge connection parallel to the axis of the gun barrel and the axis of the axle normal to the axis of the hinge connection, means connecting the two brackets to maintain the same in conjugate relation, indicators carried by the brackets, and mechanism operative to displace simultaneously the brackets around their respective axles to position the indicators at zero irrespective of any longitudinal inclination of the gun carriage.

6. In a sighting apparatus for guns, the combination of a gun carried by a cradle having trunnions journaled in a carriage, with brackets respectively mounted on the trunnions, each bracket being journaled on an axle hinged to its respective trunnion with the axis of the hinge connection parallel to the axis of the gun barrel and the axis of the axle normal to the axis of the hinge connection, means connecting the two brackets to maintain the same in conjugate relation, indicators carried by the brackets, mechanism operative to displace simultaneously the brackets around the axes of their respective hinge connections to position the indicators in vertical planes irrespective of any transverse inclination of the trunnions, and a second mechanism associated with the first mechanism operative to displace simultaneously the brackets around their respective axles to position the indicators at zero irrespective of any longitudinal inclination of the gun carriage.

7. In a sighting apparatus for guns, the combination of a gun carried by a cradle having trunnions journaled in a carriage, with a bracket connected at its intermediate part to each trunnion by a joint having an axis parallel to the axis of the gun barrel, an indicator mounted on the upper end of each bracket, a rigid connecting member articulated to the lower ends of the brackets to maintain said brackets and the indicators carried by them in parallel relation, and mechanism operative to displace the brackets around the axes of their respective joints to position the indicators in vertical planes irrespective of any transverse inclination of the trunnions.

8. In a sighting apparatus for guns, the combination of a gun carried by a cradle having trunnions journaled in a carriage, with a bracket journaled at its intermediate part on an axle hinged to each trunnion with the axis of the hinge connection parallel to the axis of the gun barrel and the axis of the axle normal to the axis of the hinge connection, an indicator mounted on the upper end of each bracket, a rigid connecting member articulated to the lower ends of the brackets to maintain said brackets and the indicators carried by them in parallel relation, and mechanism operative to displace simultaneously the brackets around their respective axles to position the indicators at zero irrespective of any longitudinal inclination of the gun carriage.

9. In a sighting apparatus for guns, the combination of a gun carried by a cradle having trunnions journaled in a carriage, with a bracket journaled at its intermediate part on an axle hinged to each trunnion with the axis of the hinge connection parallel to the axis of the gun barrel and the axis of the axle normal to the axis of the hinge connection, an indicator mounted on the upper end of each bracket, a rigid connecting member articulated to the lower ends of the brackets to maintain said brackets and the indicators carried by them in parallel relation, mechanism operative to displace simultaneously the brackets around the axes of their respective hinge connections to position the indicators in vertical planes irrespective of any transverse inclination of the trunnions, and a second mechanism associated with the first mechanism operative to displace simultaneously the brackets around their respective axles to position the indicators at zero irrespective of any longitudinal inclination of the gun carriage.

10. In a sighting apparatus for guns, the combination of a gun carried by a cradle having trunnions journaled in a carriage, with a bracket connected at its intermediate part to each trunnion by a joint having an axis parallel to the axis of the gun barrel, an indicator mounted on the upper end of each bracket, a rigid connecting member reciprocative in transverse guides formed in the gun carriage and articulated to the lower ends of the brackets to maintain said brackets and the indicators carried by them in parallel relation, and mechanism mounted on the gun carriage and engaging the rigid connecting member to be operated to reciprocate said member to displace simultaneously the brackets around the axes of their respective joints to position the indicators in vertical planes irrespective of any transverse inclination of the trunnions.

11. In a sighting apparatus for guns, the combination of a gun carried by a cradle having trunnions journaled in a carriage, with sighting and range-reading devices respectively mounted on the trunnions, a Cardan joint forming the connection between each device and its respective trunnion, said joint having its axes normal to each other and one of them parallel to the axis of the gun barrel, means for maintaining said devices in conjugate relation, mechanism for simultaneously moving said devices on one of the axes of the Cardan joints to vertical positions irrespective of any transverse inclination of the trunnions, and mechanism for simultaneously moving said devices on the other axis of the Cardan joints to zero position irrespective of any longitudinal inclination of the gun carriage.

12. In a sighting apparatus for guns, the combination of a gun carried by a cradle having trunnions journaled in a carriage provided with transverse guides, with a sighting device pivotally mounted on one of the trunnions, a range-reading device pivotally mounted on the other trunnion, a mount reciprocative parallel to the axis of the trunnions in said transverse guides, said mount being articulated at its ends respectively to the sighting device and to the range-reading device to maintain said devices in conjugate relation, means for moving the mount in its transverse guides to position said devices in vertical planes irrespective of any transverse inclination of the trunnions, the articulation at each end of the mount including mechanism for oscillating the connected device longitudinally of the carriage, and means for simultaneously actuating the oscillative mechanisms to move simultaneously both devices longitudinally on their pivots to zero position irrespective of any longitudinal inclination of the gun carriage 13. In a sighting apparatus for guns, the combination of a gun carried by a cradle having trunnions journaled in a carriage, with a sighting device pivotally mounted on one of the trunnions, a range-reading device pivotally mounted on the other trunnion, a tubular mount reciprocative parallel to the axis of the trunnions in transverse guides formed in the carriage, said mount being articulated at its ends respectively to the sighting device and to the range-reading device to maintain said devices in conjugate relation, means operable from one side of the carriage for moving the mount in its transverse guides to position said devices in vertical planes irrespective of any transverse inclination of the trunnions, the articulation of each end of the mount including mechanism for oscillating the connected device longitudinally of the carriage, and a shaft journaled in the tubular mount and operatively connected with both oscillative mechanisms, and means operable from the other side of the carriage to rotate the shaft to actuate the oscillative mechanisms to move simultaneously both devices on their pivots to zero position irrespective of any longitudinal inclination of the gun carriage.

14. In a sighting apparatus for guns, the combination of a gun carried by a cradle having trunnions journaled in a carriage, with a bracket journaled at its intermediate part on an axle hinged to each trunnion with the axis of the hinge connection parallel to the axis of the gun barrel and the axis of the axle normal to the axis of the hinge connection, an indicator mounted on the upper end of each bracket, a tubular mount reciprocative parallel to the axis of the trunnions in transverse guides formed in the carriage and articulated at its ends to the lower ends of the brackets, each articulation comprising a toothed sector movable in a guideway fixed on the end of the mount with the guideway and sector centered on the axis of the trunnions, and a cylindrical socket on the sector carrying a cylindrical block in which is journaled an axle on the lower end of the bracket; a shaft journaled in the tubular mount having pinions on its ends meshing with the toothed sectors, means on one side of the carriage for rotating the shaft to actuate the sectors to displace simultaneously the brackets around their respective axles to position the indicators at zero irrespective of any longitudinal inclination of the carriage, and means on the other side of the carriage for reciprocating the tubular mount to move through the intervening mechanism the brackets simultaneously around the axes of their hinge connections to position the indicators in vertical planes irrespective of any transverse inclination of the trunnions.

Dated this 3rd day of December 1920.

In testimony whereof I have signed this specification.

EUGÈNE SCHNEIDER.

Witnesses:
 ANDRÉ MOSTICKER,
 LOUIS GARDET.